United States Patent [19]
Pedersen

[11] Patent Number: 5,598,816
[45] Date of Patent: Feb. 4, 1997

[54] CARBURETOR METERING SYSTEM ALONE AND IN COMBINATION WITH A WICK OR SPARK PLUG

[76] Inventor: John R. C. Pedersen, No. 3 Priors Road, Cheltenham, England, GL525AB

[21] Appl. No.: 289,889

[22] Filed: Aug. 12, 1994

Related U.S. Application Data

[62] Division of Ser. No. 56,372, Apr. 30, 1993, Pat. No. 5,384,074, which is a division of Ser. No. 404,839, Sep. 8, 1989, Pat. No. 5,207,207.

[51] Int. Cl.⁶ .............................. F02M 7/17; H01T 13/20
[52] U.S. Cl. .................................... 123/169 EL; 261/44.4
[58] Field of Search ........................... 123/169 EL, 445, 123/452, 454; 261/44.4, 50.2, 69.2; 313/141

[56] References Cited

U.S. PATENT DOCUMENTS

| | | | |
|---|---|---|---|
| 2,318,216 | 5/1943 | Garretson | 261/50.2 |
| 4,364,361 | 12/1982 | Eckert | 123/454 |

FOREIGN PATENT DOCUMENTS

| | | | |
|---|---|---|---|
| 55-125356 | 9/1980 | Japan | 261/50.2 |
| 2189545 | 10/1987 | United Kingdom | 313/141 |

*Primary Examiner*—Tony M. Argenbright
*Attorney, Agent, or Firm*—Cooper & Dunham LLP

[57] ABSTRACT

A carburetor metering system is provided comprising a fuel valve including a valve member movable with respect to a valve seat to vary the fuel flow, the valve member and the valve seat having substantially parallel inclined surfaces and which define therebetween a passage for the flow of fuel having a width corresponding to the distance apart of the surfaces and a length. A wick for use a carburetor metering system is also provided for absorbing liquid for vaporization into an air flow, comprising a cloth of woven strands and means for suspending said cloth in the air flow. There is also provided a spark plug for use in a fuel combustion system. A carburetor metering system is also provided, comprising air flow control valve for metering the flow of air in dependence upon the air pressure differential across the air flow control valve and to maintain the pressure differential at a predetermined value, a fuel valve being operatively connected to said air flow control valve means so that the fuel valve provides a respective increase and decrease in fuel flow rate in respective dependence upon air flow rate and a fuel pressure differential valve for maintaining the pressure differential across the fuel valve.

20 Claims, 4 Drawing Sheets

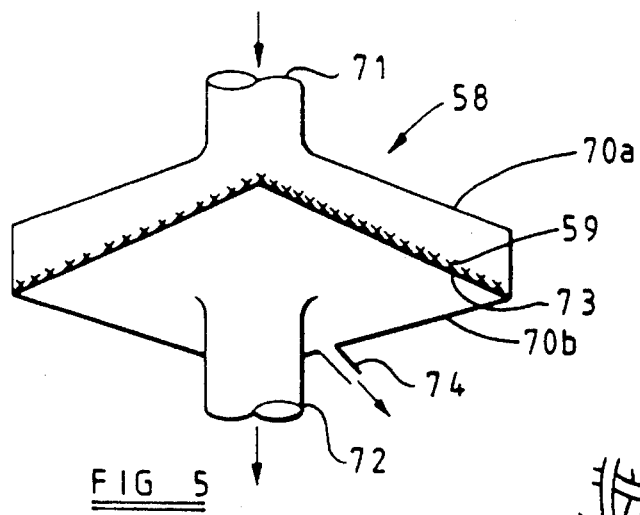
FIG 5
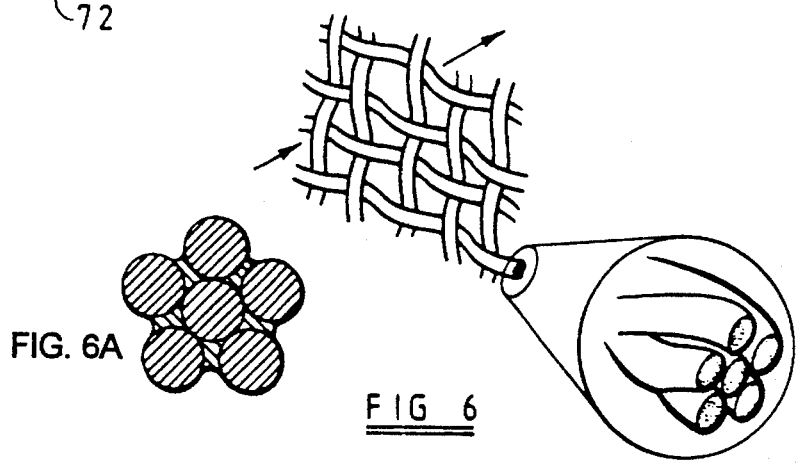
FIG. 6A
FIG 6
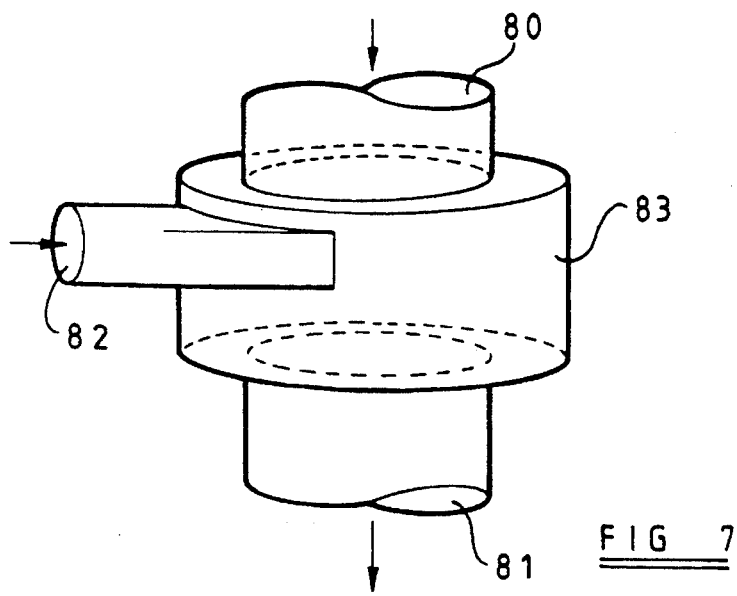
FIG 7

CARBURETOR METERING SYSTEM ALONE AND IN COMBINATION WITH A WICK OR SPARK PLUG

This application is a divisional of U.S. Ser. No. 08/056,372, filed Apr. 30, 1993, now U.S. Pat. No. 5,384,074, which is in turn is a divisional of U.S. Ser. No. 07/404,839, filed Sep. 8, 1989, now U.S. Pat. No. 5,207,207.

BACKGROUND OF THE INVENTION

This invention relates to carburetor metering systems for supplying a fuel/air mixture either alone or in combination with a wick or spark plug.

Automotive engines rarely operate at full power, so the part load condition is of greatest importance. This requires accurate metering of the fuel over a very wide range of flow rates. It has been said that the only reason a conventional carburetor can survive is because engines are very tolerant of rich mixture. Thus the conventional system, which cannot provide accurate metering over a wide flow rate range, is designed to provide richer than ideal mixture at operating points—such as low load—when it is not accurate. This approach is not adequate for today's conditions when emissions and fuel economy are subject to legislative control.

It is known that substantial advantages are to be obtained, in terms of part load fuel economy and decrease of exhaust pollution, by operating a spark ignition engine with a fuel/air mixture having excess air over that required for just complete combustion of the fuel, that is with a lean mixture of fuel in air. As mixture is weakened carbon monoxide emission rate falls rapidly to a low level and then remains low. NOx production is a maximum for air fuel ratios of about 17:1 (14.7:1 is chemically correct) after which it falls progressively. Unburned hydrocarbons fall progressively as mixture is weakened, down to a minimum after which they increase. This increase is caused either by very slow burning leading to flame extinction before completion or by occasional misfiring. Experiments show that improved ignition can hasten the whole combustion process to a degree and so postpone the increase of the leaner mixture. Improved ignition also minimizes the risk of misfire.

Conventional engines can readily tolerate excess fuel in the fuel/air mixture to a considerable degree. However, lean mixture operation requires precise control of mixture strength to ensure reliable operation without misfiring. Thus conventional carburetor systems are generally unsuitable for supplying engines operating at lean mixture strengths.

A carburetor system suitable for supplying lean mixtures of fuel in air is disclosed in British Patent Specification No. 1,595,315. This carburetor-comprises an evaporator for evaporating the fuel into a stream of air and a closed-loop control arrangement for maintaining the mixture strength at a required value in dependence on the temperature drop measured across the evaporator. While such a carburetor is capable of operating adequately in a lean burn system, it has a fairly slow response time, typically of the order of ¼ second, which can render the engine sluggish in operation. It would therefore be advangageous to provide a carburetor metering system which provides accurate fuel/air mixtures, particularly lean mixtures, and adjusts the mixture quickly in dependence on load changes over a wide range of air flows.

The present invention is also directed to an improved wick for a vaporizer usable in a carburetor metering system. One such wick vaporizer is disclosed in U.S. Pat. No. 4,290,401, in the name of the present applicant, and which is incorporated by reference herein. Such a wick vaporizor comprises a plurality of suspended wick elements having bottom ends of unequal length suspended above a liquid fuel reservoir, with the number of wicks that are wet at any one time being dependent on the level of fuel in the reservoir. Temperature measuring means are provided in an air stream both before and after the air stream passes through the vaporizer. The amount of measured temperature drop of the air stream across the vaporizer indicates the latent heat of the liquid fuel and thus the amount of liquid fuel being introduced into the air stream by evaporation. The level of fuel in the reservoir is adjusted in a controlled fashion in response to the temperature drop. This wick vaporizor arrangement provides good closed loop control. However an improved wick construction which provides an improved vaporization rate would be desireable.

The present invention also relates to a spark plug for use in a combustion system. A conventional spark plug has a body, within which is supported an insulated central electrode and on which a side electrode is secured so as to extend over the end of the central electrode. Conventionally the central and side electrodes have respective opposing flat surfaces, across which the spark is generated, the distance apart of these surfaces being adjusted by bending the side electrode towards or away from the central electrode. The two generally flat surfaces are thus often set at an arbitrary angle so that one portion of the pair of surfaces is closer together than another. The point or points at which the spark will occur is thus quite random.

Sparking, therefore, often occurs in a zone which is relatively enclosed between the electrodes and to which only a small amount of combustible mixture may have penetrated. Flame generation may thus, in some cases be relatively slow. This may give rise to incomplete combustion or poor combustion characteristics, in relation to the travel of the piston, or otherwise. Erosion of the electrodes due to uneven sparking, or sparking in one particular zone is also observable.

The time cycle is of course short but it has been shown that there are two stages of combustion, namely spark initiation, during which there is no pressure rise, and then general flame propogation across the combustion chamber. The boundary between the two stages is indistinct but can be defined as the point in time at which the pressure first departs detectably from the level it would have if no combustion took place. The duration of the first stage is known to depend on the pressure and temperature of the charge just before the spark and also on the mixture strength in and around the spark gap, but not, to any great extent, on turbulence in the combustion chamber. The duration of the second stage depends again on pressure, temperature and mixture strength but also very strongly on turbulence. Engines are usually timed so that, at a usual working speed, the first stage and about half of the second stage are completed by the time the piston reaches top dead center. Any significant variation from this timing results in loss of efficiency.

It is also well known that fuel economy and improved exhaust pollution are improved if the mixture is as lean as possible. The shorter the first stage, the more practical is the use of leaner mixtures.

When conventional sparking plugs are used, the duration of the first stage of ignition increases greatly as mixture strength is reduced.

For example, in the publication, "The High Speed Internal Combustion Engine", by Sir Harry Ricardo published 1953 (4th edition), results of tests are given as follows:

| Mixture strength (% chemically correct) | Angle turned by crank during first stage |
| --- | --- |
| 70 | 50° |
| 80 | 20° |
| 90 | 10° |
| 100 | 6° |
| 110 | 5° |
| 120 | 5° |

(These results were taken at an engine speed of 2000 rpm.) Increased spark advance reduces the pressure and temperature at time of the spark. As mixture is weakened or engine speed is increased the tendency of reduced pressure and temperature to increase the first stage duration as ignition is advanced eventually exceeds the advance and no further reduction in strength or increase in speed is possible.

It can be shown that the size of the opposing surfaces of conventional electrodes contributes to the relatively slow completion of the first stage of combustion, since the relatively large areas of metal contribute a cooling effect on the burning mixture. Indeed it can be calculated that the duration of the first stage approximately matches the time for the flame front to reach the limit of the electrodes.

U.S. Pat. No. 4,465,952 discloses a spark plug in which the central and side electrodes define respective parallel, elongate sparking surfaces arranged opposite one another. The sparking surfaces are coated with a noble metal and are flanked along their longitudinal edges by oppositely inclined surfaces sloping away from the sparking surfaces. However, such a spark plug is expensive to produce and does not satisfactorily solve the problem of igniting weak mixtures.

U.S. Pat. No. 4,122,816 discloses a spark plug having a central electrode having a frustoconical end whose outer curved surface constitutes a first sparking surface, and an annular side electrode surrounding the central electrode and having an inner surface of frustoconical shape inclined in the opposite direction to the frustoconical end of the central electrode and defining a second sparking surface opposite the first sparking surface. The spark gap of such a spark plug is generally annular and diverges towards the end of the central electrode. Whilst such an arrangement of the sparking surfaces will tend to cause the spark to advance towards the end of the sparking surfaces during ignition, the spark will tend to be confined by the annular shape of the side electrode. Furthermore the shape of the sparking surfaces will tend to result in wear of the surfaces in operation resulting in uneven sparking.

In view of the foregoing it is an object of the present invention to provide a carburetor metering system capable of accurately controlling fuel flow over a wide range of air flows and mixture strengths.

It is another object of this invention to provide a spark plug for use in a combustion system in which the effect of weak mixture on the duration of the first stage is minimized, this enabling the known advantages of lean mixtures to be realized, affording favorable combustion characteristics and fuel economy as well as minimizing pollution from unburnt or incompletely burnt gases.

It is another object of the present invention to provide an improved wick construction which provides an improved vaporization rate.

SUMMARY OF THE INVENTION

According to the present invention, there is provided a carburetor metering system comprising a fuel valve for injecting liquid fuel into a stream of air, the valve comprising a valve member movable along a displacement axis with respect to a valve seat to vary the fuel flow through the valve, the valve member and the valve seat having substantially parallel surfaces which are inclined with respect to the displacement axis and which define therebetween a passage for the flow of fuel having a width corresponding to the distance apart of the surfaces and a length corresponding to the degree of overlap of the surfaces, the length of the passage varying substantially in proportion to the width as the valve member is moved along the displacement axis.

The system of the invention has been developed after detailed study of the mechanisms which affect fuel flow rates in conventional carburetors. As is well known, a pressure difference induced by the air flow is generally used to drive fuel through the metering orifice, and the fuel flow rate is caused to vary in dependence on the air flow rate. However, the fuel flow rate tends to vary unpredictably with air flow rate due to the fact that there are two different mechanisms which determine the relevant pressure differentials, one of which arises from the viscosity of the fluid and the other of which is dependent on momentum changes of the fluid. The relative magnitude of the two mechanisms varies with temperature and pressure, as well as with fluid flow. Furthermore, the relative magnitude of the two mechanisms is different for fuel and air in view of the different volume flow rates of fuel and air. The system of the invention is chosen so as to minimize the effects of momentum changes in the fuel orifice.

In a further aspect of the invention the system further comprises an air control valve for varying the air flow in dependence on movement of the valve member of the fuel valve. Preferably the geometry of the air control valve is chosen such that the effect of the viscosity of the air on the pressure difference across the valve is negligible. Furthermore the relative geometries of the throughflow orifice of the fuel valve and the air control valve are preferably such that, with a constant pressure difference across the air control valve, the mixture strength is substantially independent of flow over a wide range of air flows. The air control valve comprises a seat member and a gate member cooperating to define at least one triangular orifice, the gate member being movable with respect to the seat member to vary the throughflow cross-section of the orifice.

The fuel valve has a circular orifice within which a tapered end of the valve member is movable, the fuel passage being defined between a frustoconical surface of the tapered end of the valve member and a surrounding frustoconical surface of the valve seat.

Furthermore it is advantageous for the valve seat to have a cylindrical surface which lies immediately upstream of its frustoconical surface and which merges steplessly into its frustoconical surface.

In addition it is advantageous for the valve member to have a cylindrical surface which lies immediately downstream of its frustoconical surface and which merges steplessly into its frustoconical surface.

Also in accordance with the present invention, a wick for use a carburetor metering system is provided for absorbing liquid for vaporization into an air flow, comprising a cloth of woven strands and means for suspending said cloth in the air flow.

Also in accordance with the present invention there is provided a spark plug for use in a fuel combustion system, said spark plug having a central electrode and a side electrode having respective sparking surfaces arranged opposite one another and defining a spark gap therebetween, each of the sparking surfaces being elongate and being flanked along its longitudinal edges by oppositely inclined surfaces sloping away from the sparking surface, wherein the two sparking surfaces are inclined relative to one another in the longitudinal direction so that the spark gap widens in the direction in which sparking tends to advance along the gap.

Preferably the central electrode has a circular cross-section at a distance from its sparking surface and its sparking surface constitutes an end surface of the central electrode. The sparking surface of the central electrode conveniently has its longitudinal edges symmetrically disposed with respect to a diameter of the central electrode.

The side electrode is preferably elongate and extends inwardly from one side of the central electrode and its sparking surface extends generally lengthwise of the side electrode. Preferably the sparking surface of the side electrode has its longitudinal edges symmetrically disposed with respect to the direction in which the side electrode extends. The side electrode may be generally L-shaped.

In an alternative embodiment of the spark plug according to the invention the sparking surface of the central electrode is disposed on one side of the central electrode, and the sparking surface of the side electrode constitutes an end surface of the side electrode which extends inwardly from one side of the central electrode.

According to another aspect of the present invention a carburetor metering system is provided, comprising air flow control valve means, including an air inlet and an air outlet, for metering the flow of air from said air inlet to said air outlet in dependence upon the air pressure differential between the air inlet and air outlet to maintain the pressure differential at a predetermined value, fuel valve means having an inlet connected to a source of fuel, and an outlet, said fuel valve means being operatively connected to said air flow control valve means so that the fuel valve means provides a respective increase and decrease in fuel flow rate in respective dependence upon an increase and decrease in air flow rate by said air flow control means, and a fuel pressure differential valve means for maintaining the pressure differential across the fuel valve means substantially constant, to thereby provide a metering system wherein the fuel and air pressures are controlled separately. Preferably, two restrictors are connected in series across the fuel valve means at the inlet and outlet, and the fuel pressure differential valve means comprises a chamber having a diaphram to define first and second subchambers, the first subchamber being in communication with the valve means outlet and the outlet, and the second subchamber being in communication with the junction of the two restrictors, such that the pressure difference across the diaphram is fixed and is a predetermined fraction of the total pressure difference across the first fuel valve means.

According to another aspect of the invention, a fuel carburetor metering system is provided for use in a fuel combustion engine having loads ranging from part load to full load, comprising means for vaporizing liquid fuel into an air flow at a relatively constant mixture strength for a full load condition, means, downstream of said means for vaporizing, for introducing hot dilution air into said air flow containing vaporized fuel, and means for controlling the amount of hot dilution air introduced into said air flow in response to load conditions of said engine, to provide a relatively leaner mixture at part load conditions and a relatively richer mixture at full load conditions.

BRIEF DESCRIPTION OF THE DRAWINGS

FIG. 5 is a cross-sectional view of the wick chamber of FIG. 4 in greater detail;

FIG. 6 is a perspective view of the wick material of the wick chamber of FIG. 5;

FIG. 6A is a cross-sectional view of a strand of six fibers from the wick material of FIG. 6:

FIG. 7 is a perspective view of the vortex chamber of FIG. 4 in greater detail;

DETAILED DESCRIPTION OF THE PREFERRED EMBODIMENTS

Figure 1:
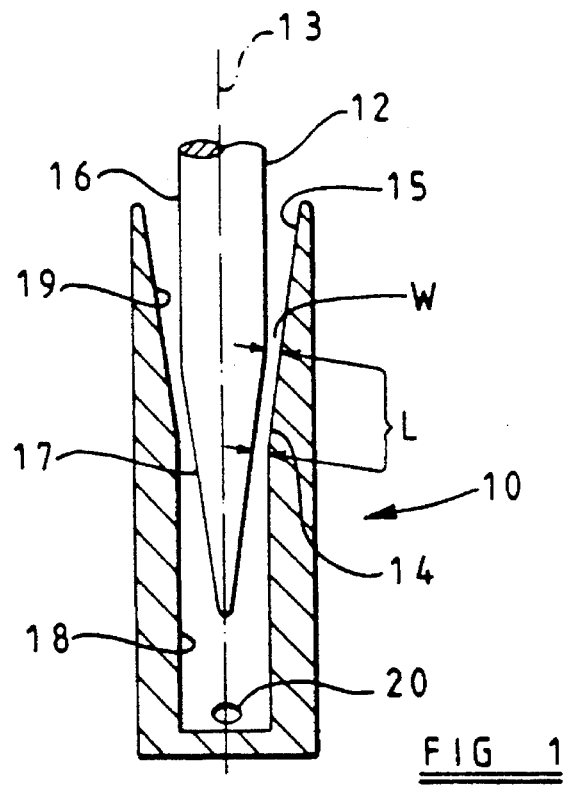
FIG. 1 is an axial cross-sectional view of a fuel valve of a metering system according to the present invention.

In accordance with the present invention, a carburetor metering system is provided comprising a fuel valve for injecting liquid fuel into a stream of air, the fuel valve comprising a fuel valve member movable along a displacement axis with respect to a valve seat to vary the fuel flow through the fuel valve between twos limiting positions, namely a substantially closed position and a fully open position, the fuel valve member and the valve seat having substantially parallel surfaces which are inclined with respect to the displacement axis and which define therebetween a passage for the flow of fuel having a width corresponding to the distance apart of the surfaces and a length corresponding to the degree of overlap of the surfaces, the form of said surfaces being such that, as the fuel valve member is moved along the displacement axis from its substantially closed position towards its fully open position, the length and the width of the passage increase substantially proportionally from values of substantially zero. The carburetor metering System also preferably comprises an air control valve for adjusting the fuel valve member to vary the fuel flow through the fuel valve, in dependence on the air flow.

The geometry of the air control valve is chosen preferably such that the effect of the viscosity of the air on the pressure difference across the air control valve is negligible. The relative geometries of the throughflow orifice of the fuel valve and the air control valve are such that, with a constant pressure difference across the air control valve, the mixture strength is substantially independent of air flow over a wide range of air flows.

The carburetor metering system also preferably includes wick means for absorbing liquid fuel and for exposing said fuel to the air flow. The wick means may be made of a cloth of woven strands wherein each of the strands comprises a plurality of twisted or braided fibers of metal wire, glass or natural material. Preferably six fibers are provided and are arranged with one central fiber and five fibers twisted around said central fiber.

Also according to the present invention, a fuel combustion system is provided including the above described carburetor metering system combined with at least one spark plug. The spark plug preferably has a central electrode and a side electrode having respective sparking surfaces arranged opposite one another and defining a spark gap therebetween, each of the sparking surfaces being elongate and being flanked along its longitudinal edges by oppositely inclined surfaces sloping away from the sparking surface, wherein the two sparking surfaces are inclined relative to one another in the longitudinal direction so that the spark gap widens in the direction in which sparking tends to advance along the gap. The central electrode has a circular cross-section at a distance from its sparking surface and its sparking surface constitutes an end surface of the central electrode. The sparking surface of the central electrode has its longitudinal edges symmetrically disposed with respect to a diameter of the central electrode. The side electrode is elongate and extends inwardly from one side of the central electrode and its sparking surface extends generally lengthwise of the side electrode. The sparking surface of the side electrode has its longitudinal edges symmetrically disposed with respect to the direction in which the side electrode extends. The side electrode is generally L-shaped. The sparking surface of the central electrode may alternatively be disposed on one side of the central electrode, with the sparking surface of the side electrode constituting an end surface of the side electrode which extends inwardly from one side of the central electrode.

Further in accordance with the present invention a carburetor metering system is provided, comprising air flow control valve means, including an air inlet and an air outlet, for metering the flow of air from said air inlet to said air outlet in dependence upon the air pressure differential between the air inlet and air outlet to maintain the pressure differential at a predetermined value, fuel valve means having an inlet connected to a source of fuel, and an outlet, said fuel valve means being operatively connected to said air flow control valve means so that the fuel valve means provides a respective increase and decrease in fuel flow rate in respective dependence upon an increase and decrease in air flow rate by said air flow control means, and a fuel pressure differential valve means for maintaining the pressure across the fuel valve means substantially constant, to thereby provide a metering system wherein the fuel and air pressures are controlled separately.

Preferably, two restrictors are connected in series across the fuel valve means at the inlet and outlet, and the fuel pressure differential valve means preferably comprises a chamber having a diaphram to define first and second subchambers, the first subchamber being in communication with the fuel valve means outlet and the second subchamber being in communication with the junction of the two restrictors, such that the pressure difference across the diaphram is fixed and is a predetermined fraction of the total pressure difference across the fuel valve means. The restrictors are preferably adjustable. The fuel valve means preferably comprises a fuel valve member movable along a displacement axis with respect to a valve seat to vary the fuel flow between two limiting positions, namely a substantially closed position and a fully open position, the fuel valve member and the valve seat having substantially parallel surfaces which are inclined with respect to the displacement axis and which define therebetween a passage for the flow of fuel having a width corresponding to the degree of overlap between the surfaces, the form of said surfaces being such that, as the fuel valve member is moved along the displacement axis from its substantially closed position towards its fully open position, the length and width of the passage increase substantially proportionally from values of substantially zero.

Wick means are also preferably provided for absorbing liquid fuel and for exposing said fuel to the air flow. The wick means comprises a cloth of woven strands, wherein each of the strands comprise a plurality of twisted or braided fibers made of metal wire, glass, or natural material. Preferably six fibers are provided and are arranged with one central fiber and five fibers twisted around said center fibers.

According to another aspect of the invention, a fuel combustion system is provided comprising the carburetor metering system just described, and including at least one spark plug, wherein said spark plug may be in the particular form described above.

Further in accordance with the present invention, a fuel carburetor metering system for use in a fuel combustion engine having loads ranging from part load to full load is provided comprising means for vaporizing liquid fuel into an air flow at a relatively constant mixture strength suitable for a full load condition; means, down stream of said means for vaporizing, for introducing hot dilution air into said air flow containing vaporized fuel; and means for controlling the amount of hot dilution air introduced into said air flow in response to road conditions of said engine, to provide a relatively leaner mixture at part load conditions and a relatively richer mixture at full load conditions. The fuel carburetor metering system further includes thermostatic valve means for introducing hot dilution air into said air flow only in response to the dilution air being greater than a predetermined temperature. The means for introducing hot dilution air preferably comprises a vortex chamber for introducing the hot dilution tangentially and transverse to the air flow containing vaporized fuel. The metering system further includes a heat exchanger for heating air to provide the hot dilution air, and an air intake port, and wherein the heat exchanger and the means for vaporizing liquid fuel are both connected to receive air from the air intake port.

Further in accordance with the present invention, a wick for use in a carburetor metering system is provided for absorbing liquid fuel for vaporization into an air flow. The wick may be in the form as described above.

Further in accordance to the present invention, a method for metering liquid fuel and air for carburetion is provided comprising metering the flow of air between an air inlet and an air outlet in an air control valve in dependence upon the air pressure differential across the valve to maintain the pressure differential at a predetermined value, metering a source of the liquid fuel from a fuel inlet to a fuel outlet in dependence of the metering of the flow of air so that the liquid fuel metering respectively increases and decreases when the air flow rate increases and decreases, and maintaining the pressure across the first fuel valve means substantially constant, whereby the fuel and air pressures are controlled separately.

Further in accordance with the present invention, a method for metering fuel is provided for use in a fuel combustion engine having loads ranging from part load to full load, comprising vaporizing liquid fuel into an air flow at a relatively constant mixture strength suitable for a full load condition, introducing hot dilution air into the air flow having the vaporized fuel, and controlling the amount of hot dilution air introduced into said air flow in response to load conditions of said engine, to provide a relatively leaner mixture at part load conditions and a relatively richer mixture at full load conditions.

Refering to FIG. 1, the fuel valve 10 comprises a needle valve member 12 movable along a displacement axis 13 with respect to a valve seat 14. The valve 10 has a circular orifice 15 by way of which liquid fuel is injected into a stream of air. The valve member 12 has an outer cylindrical surface 16 and a tapered end defining a frustoconical surface 17. The valve seat 14 has an inner cylindrical surface 18 and a frustoconical surface 19 surrounding the frustoconical surface 17 of the valve member 12. The valve seat 14 is provided with a fuel inlet 20.

The conical angle of the frustoconical surface 17 matches the conical angle of the frustoconical surface 19, and the two surfaces 17 and 19 overlap one another so as to define therebetween an annular passage for the flow of fuel. It will be appreciated that the length of overlap L of the surfaces 17 and 19 will vary substantially in proportion to the width W of the passage as the valve member 12 is moved along the displacement axis 13 with respect to the valve seat 14. Thus the fuel flow through the orifice 15 for a given pressure difference is proportional to the square of the width W which is in turn proportional to the degree to which the valve member 12 is lifted.

Figure 2:
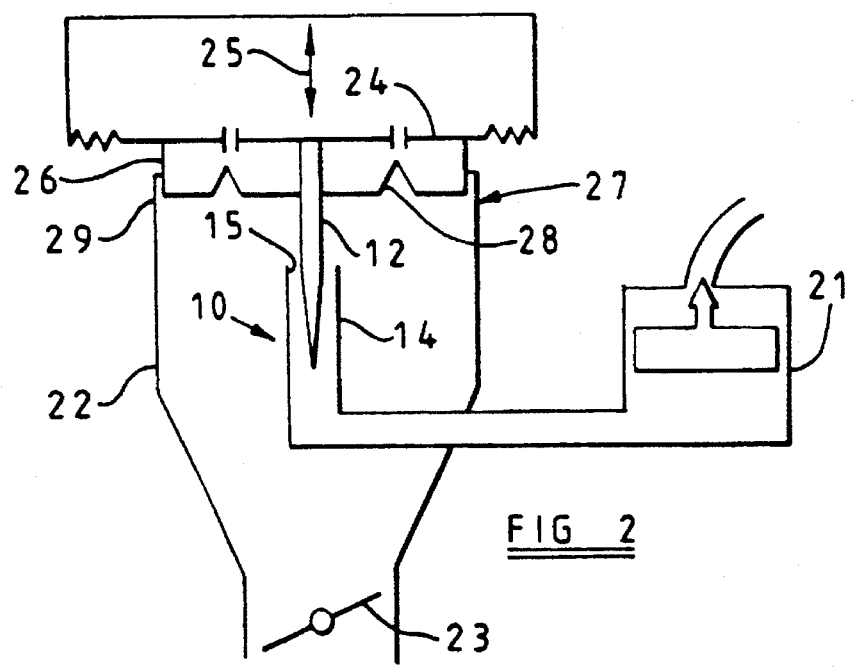
FIG. 2 is a schematic diagram of a metering system for fuel and air in accordance with the present invention.

FIG. 2 shows the fuel valve 10 connected to a conventional float chamber 21 for supplying liquid fuel to the valve 10. The fuel orifice 15 opens into an air duct 22 provided with a throttle 23. The valve member 12 is connected to a movable diaphragm 24 capable of being deflected in the direction of the arrows 25 to move the valve member 12 with respect to the valve seat 14 so as to vary the fuel flow through the valve 10. Also connected to the diaphragm 24 is a gate member 26 of an air control valve 27. The gate member 26 has a cylindrical wall having a plurality of triangular cut-outs 28 along its edge. Furthermore the gate member 26 fits within the cylindrical end of the duct 22 which defines a seat member 29 of the air control valve 27.

It will be appreciated that, as the diaphragm 24 is deflected in the direction of the arrows 25, the gate member 26 will be moved within the seat member 29 so as to vary the throughflow cross-section of the triangular cut-outs 28. Thus the throughflow cross-section of the air control valve 27 varies in proportion to the square of the degree of deflecting of the diaphragm 24, and hence the degree of displacement of the valve member 12.

The geometries of the orifices of the fuel valve 10 and the air control valve 27 are chosen so as to ensure that, with a constant pressure difference across the air control valve, the mixture strength is independent of flow over a range limited only by manufacturing inaccuracy, and so that adjustment of the pressure difference can be used to adjust the mixture strength. In this regard the pressure difference across the air control valve 27 is used to effect lifting of the gate member 26.

With this arrangement the mixture strength is proportional to the square root of the pressure difference. If required the mixture strength can be adjusted by arranging for only an adjustable fraction of the whole pressure difference across the air control valve 27 to be used to lift the gate member 26 against its dead weight or a return spring. Typically, it is necessary to adjust the pressure difference to provide variable mixture strength and compensate for changes in fuel viscosity and air density.

It will be appreciated that the particular geometries of the valve member 12 and the valve seat 14 of the fuel valve 10 are advantageous because they ensure that pressure differences related to the viscosity of the fuel are substantially greater than pressure differences due to momentum changes of the fuel, and since the essential geometry of the fuel passage is maintained as the throughflow cross-section is varied.

The described carburetor metering system is capable of accurately controlling the fuel flow over a wide range of air flows and mixture strengths, and is therefore particularly applicable to lean mixture operation. The system typically has a response time of the order of a tenth of a second.

Figure 3:
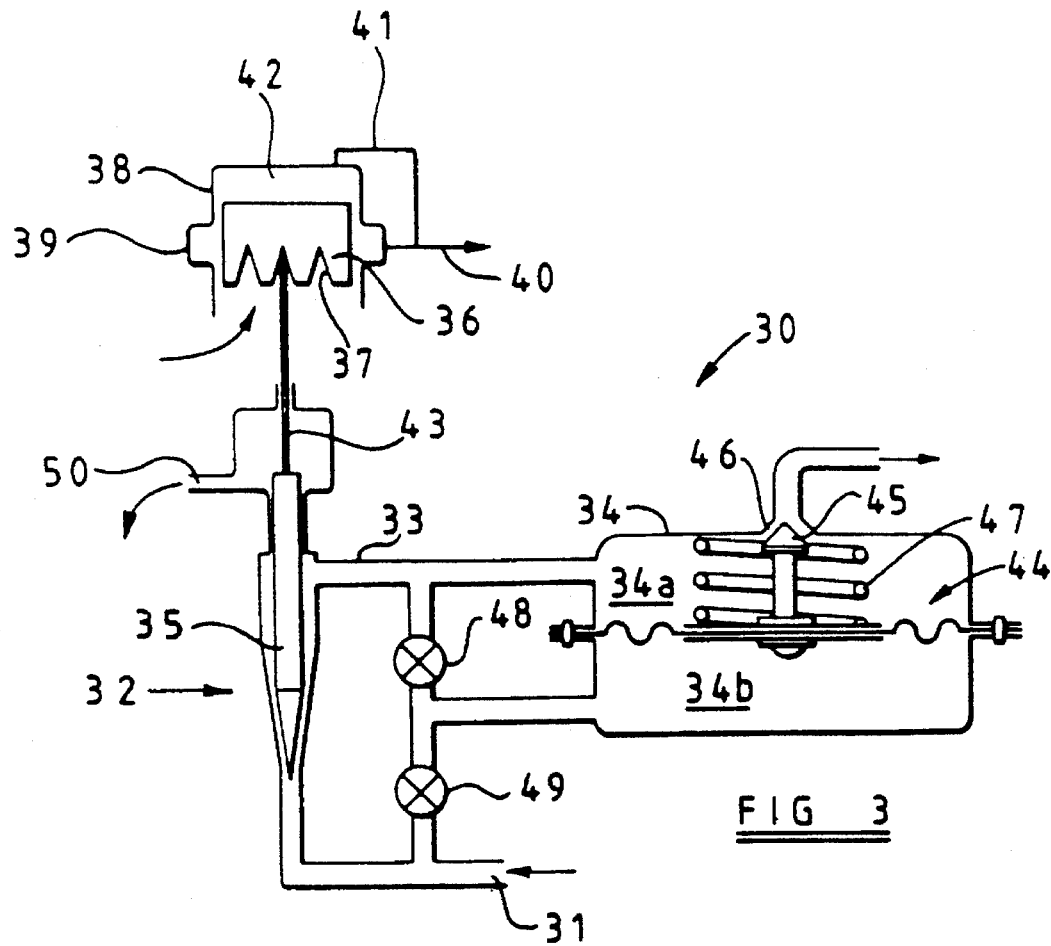
FIG. 3 is an alternative arrangement of a metering system for fuel and air in accordance with the present invention.

FIG. 3 shows another embodiment of a carburetor metering system according to the invention. In this system, the fuel metering valve is mechanically connected to the air valve.

In FIG. 3, a carburetor metering system 30 is shown wherein liquid fuel from a fuel pump (not shown) enters a fuel inlet 31 of a fuel valve 32. The fuel valve 32 has an outlet 33 connected to a fuel chamber 34 arranged as a pressure differential chamber as will be described. The fuel valve 32 may be arranged in the geometry according to FIG. 1 except that the exit is not exposed to the air. The fuel valve 32 has a valve member 35 mechanically connected and operatively coupled to an air valve member 36.

The air valve member 36, shown schematically, is arranged as an inverted cup and has triangular cut-outs 37 arranged around its periphery. The inverted cup is received in a seat 38 having an annular chamber 39 connected to an air outlet 40. A pressure link 41 connects the air outlet 40 and the upper interior region 42 of the seat 38 to maintain the region 42 at equal pressure with air outlet 40. As is apparent from the air valve shown and described, the valve member moves upwardly when inlet air pressure exceeds air outlet pressure present in air outlet 40 and upper region 42. As the air valve member 36 moves vertically upwardly, a greater portion of the triangular regions 37 will intersect the annular chamber 39, thus increasing air flow through the air valve. When outlet pressure decreases relative to inlet pressure, valve member 36 drops, thus decreasing air flow through the air valve. Movement of the valve member 36 vertically will cause the fuel valve member to move likewise due to mechanical coupling 43.

The fuel chamber 34 has an upper subchamber 34a and a lower subchamber 34b, separated by a diaphragm 44. The diaphragm 44 is flexibly mounted in the vertical center of the chamber as shown. Mounted on the diaphragm 44 is a fuel valve 45 which is received in fuel outlet seat 46 of chamber 34. A spring 47 is also provided between diaphragm 44 and the top of the chamber 34.

The lower subchamber 34b is connected to the junction point of two adjustable restrictors 48 and 49 connected in series across the fuel inlet 31 and fuel outlet 33 of fuel valve 32. The pressure difference between subchamber 34a and 34b is a fraction of the total pressure drop across the fuel valve 32, the fraction being determined by the setting of the adjustable restrictors 48 and 49.

In operation, excess fuel flow through fuel valve 32 for a given position of fuel valve member 35 (and in turn a given position of air valve member 36 and hence given air flow) causes fuel valve 45 to move vertically upwards towards a more closed position, due to drop in pressure in subchamber 34a relative to subchamber 34b, and hence corrects fuel flow excess. The spring force from spring 47 is substantially constant since air pressure drop to lift air valve member 36 is constant. A fuel drain 50 disposes of leakage fuel, which, since it is relatively small in quantity, can be added to air flow since fuel has already passed metering fuel valve 35.

Restrictors 48 and 49 control the air/fuel mixture strength. Either one of these restrictors can be fixed. Both of these restrictors allow only a relatively small flow compared to fuel valve 32. Any flow through restrictors bypasses metering fuel valve 35 and no flow enters or leaves subchamber 34b except in transients.

The best arrangement for metering and mixture monitoring is to operate the basic system at a constant mixture strength, because thermometers which are used to measure temperature drop (across an evaporator for example) do not respond quickly enough to changes. However, duty requires a lean fuel mixture at part load, and a richer full strength mixture at full load.

At part load it is advantageous to reduce the weight of charge taken by engine. Reducing the charge by using throttling is not desirable because it lowers intake manifold pressure, needing more work from engine and causing back flow of exhaust. One can advantageously heat the air/fuel charge with waste heat to reduce density and hence the weight without change (or substantial change) of pressure. Heating has to be rapid to cover transients.

Figure 4:
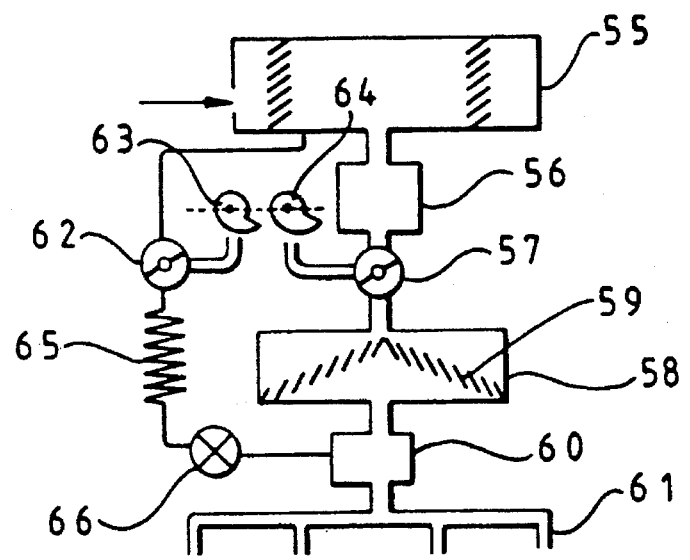
FIG. 4 is a schematic diagram of an overall arrangement for a carburetor metering system according to the present invention, showing in particular an arrangement for adding hot dilution air.

FIG. 4 is a schematic showing an overall arrangement for a carburetor metering system according to the invention in the environment of a vehicle, for example, and shows in particular an arrangement according to the invention for adding hot dilution air. The schematic layout shows an air cleaner 55 providing air to an air valve 56 connected in turn to a mixture throttle 57. The mixture throttle 57 is connected to a fuel wick chamber 58 having a wick 59, which will be described in more detail below. The wick chamber 58 functions as an evaporator for the liquid fuel. The vaporized fuel/air mixture then goes to a vortex chamber 60, to be described in more detail below, and then to an intake manifold 61.

Also shown in FIG. 4 is an air path on the left, wherein air from air cleaner 55 is provided to a diluent throttle 62. The diluent throttle 62 is controlled by cam 63 whereas the mixture throttle 57 is controlled by cam 64, and both cams are controlled by the same camshaft turned by the accelerator pedal of a vehicle. The shapes of the cams would be determined by engine testing.

The output from the diluent throttle 62 is connected to a heat exchanger 65, which may be physically located adjacent an existing heat source such as an exhaust manifold or exhaust pipe. The heat exchanger 65 is connected to a thermostatic valve 66 and then to the vortex chamber as will be described below.

The arrangement shown in FIG. 4 according to the invention provides dilution air downstream of an evaporator wick system. In this arrangement, since wick exit flow and diluent are both gas, the proper proportion is not difficult to arrange or maintain. The present invention provides for using hot dilution air with the added advantage that raising inlet temperature extends lean burn range. The precise temperature can be determined experimentally and is achievable. Dilution from a reservoir of hot air provides very fast transient response.

In FIG. 4, diluent air is extracted from the air cleaner 55, passed through its own throttle 62, through a heat exchanger and finally to a second valve 66 to a vortex chamber 60. The diluent throttle 62 has the same temperature at entry as does the main mixture throttle 57, to maintain flow balance. The second (thermostatic) valve 66 is controlled by a temperature sensor and is closed when the air is cold, so that no dilution is provided when the air is cold.

While FIG. 4 shows the mixture throttle 57 upwind of the wick chamber 58, it may be downwind. Experimental results will very well dictate which is the preferred arrangement if any.

FIG. 5 shows the wick chamber 58 of FIG. 4 in greater detail. The wick chamber 58 may take many forms, including those shown in U.S. Pat. No. 4,290,401 for example, which is incorporated by reference herein. In FIG. 5 the wick chamber includes an upper conical container portion 70a and a lower conical container portion 70b and having an air inlet 71 and a vapor mix outlet 72. A wick support grid 73, which may be in the form of a wire screen or mesh of a coarser size then the wick, is provided to support a wick 59 in a pyramid fashion as shown. Liquid fuel is shown schematically injected into the wick chamber 58, and can be injected by sprinkling or spraying means to spread the fuel out over the wick.

The wick 59 may be in the form of a closely woven cloth of spun fibers as shown in FIG. 6. The strands in the weave of cloth contain 6 (six) fibers which are spun or twisted in a conventional manner. Liquid fuel injected into the wick chamber 58 will spread by capillary action and lodge in the fine spaces between the fibers and will evaporate into the air as the air streams through the cloth as shown in FIG. 6A. The fiber diameter should preferably be as small as possible within the constraints of material strength and availability. A drain 74 is provided for the run-off of unevaporated liquid fuel. Since fuel injected into the wick chamber has already been metered, the drain 74 is not necessary, and liquid fuel can be allowed to run out of the vapor mix outlet 72. The drain 74 may be connected further downstream of the wick chamber 58.

The small size of the fiber gives maximum surface area for a given weight of fuel resident and lodged in the structure. The small size also gives maximum evaporation effect for given pressure drop in airways. While it is possible to use more than one layer of wick of coarser size, a single fine layer is preferred.

The fibers of the wick may be composed of spun long fibers of wire, glass or natural material. As stated above, an arrangement of six fibers to comprise one strand is the preferred construction in terms of surface area, fuel spreading along the spaces between the fibers within the strands, minimum resident fuel, i.e. quantity of fuel needed to wet the wick surface, and exposure to air flowing in the fine air spaces between the fibers. Of the three materials of wire, glass or natural material, the wire can act as a flame trap and has minimal risk of shedding fragments into the airstream. It is therefore preferred and the effects of heat spread through the metal is probably, on balance, an advantage.

Referring again to FIG. 5, under cold conditions, a fraction of the fuel will likely fail to evaporate in the cold air passing the wick. The simplest means of disposal is to use a small additional wick in the diluent air stream. The run off is passed to this wick where it joins the main flow as vapor.

Referring now to FIG. 7, the vortex chamber 60 of FIG. 4 is shown in greater detail. The vortex chamber 60 has an inlet 80 which receives air/fuel mixture from the wick chamber and an outlet 81 which is connected to the intake manifold for the engine. Hot diluent air from thermostatic valve 66 is provided at side inlet 82 into an enlarged annular vortex mixing chamber 83. The hot diluent air is provided tangentially to the annular chamber and transverse to the air/fuel mixture flow, where the hot diluent air follows a circular helical path. Mixing of the hot diluent air with the cold air in the generally downward vertical direction is encouraged by the fact that the more dense cold air mixture will try to move radially outwards while the hot, less dense diluent air will try to move inwardly.

A spark plug according to one aspect of the present invention will now be described with reference to FIGS.

Figure 8:
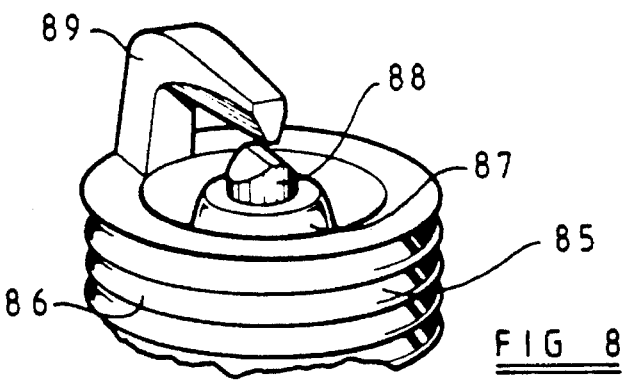
FIG. 8 is a perspective view of the operative end of a spark plug according to the invention.

8–10. The illustrated spark plug is of generally conventional construction except for the electrodes, as will be described. The spark plug as shown in FIG. 8 has a body 85 of conventional form including an externally screw-threaded portion 86 and a hexagonal or other portion by means of which it can be engaged by a spanner or socket to fit or remove it from an engine cylinder head or equivalent part.

Within the body 85 is a ceramic insulator 12 which is positioned within the screw-threaded hollow cylindrical end of the body 85. There is a gap around the insulator 87 and its shape may be determined in a known manner dictated by cooling or other factors.

Passing through the center of the insulator 87 is a central electrode 88. This extends right through the insulator and terminates in a screw-threaded portion or other portion to which a lead can be connected.

Fixed, as by welding, to the annular end of the body 85 is a side or earth electrode 89. This is of L-shape having one limb secured to the body 85 and the other limb extending over the central electrode 88.

Figure 9:
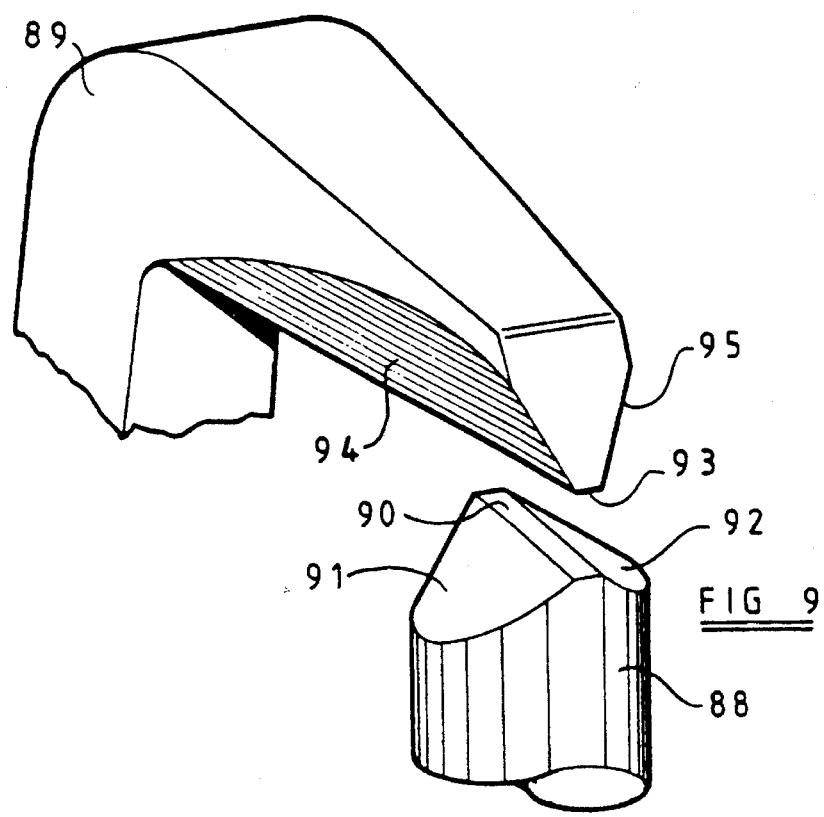
FIG. 9 is an enlarged perspective view of the electrodes of the spark plug of FIG. 8.

As seen particularly in FIG. 9 the central electrode 88 is of cylindrical form but its end is shaped to provide a flat narrow rectangular rail-like surface 90 flanked by two inclined surfaces 91, 92.

The side electrode 89 has a surface presented towards the central electrode, this surface being shaped to provide a narrow rail-like surface 93 aligned with the surface 90 on the central electrode and of generally the same proportions. The surface 93 on the side electrode 89 is also flanked by inclined surfaces 94, 95. The portion of the surface 90 on the central electrode is parallel sided and of similar width and length to the surface 90 on the central electrode but is then flared so as to merge with the surface of the side electrode as shown.

The inclined surfaces 91, 92, 94, 95 provide substantial clearance between the electrodes other than in the regions of the opposing surfaces 90 and 93.

Figure 10:
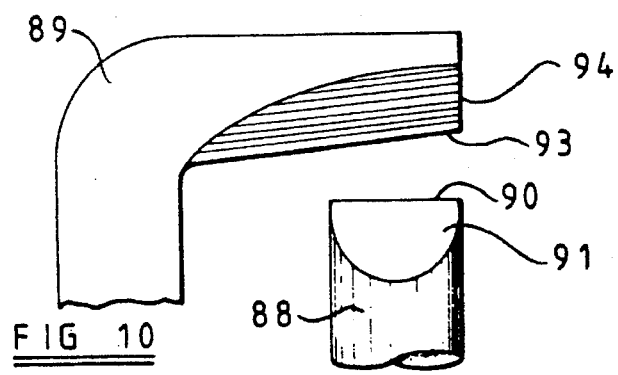
FIG. 10 is a side view of the electrodes of the spark plug of FIG. 8.

As seen in FIG. 10 the surfaces 90 and 93 lie at a small acute angle relative to one another with the narrowest gap between them being at the end at which the side electrode 89 is secured to the body 85 of the spark plug.

In use the spark plug is fitted into a combustion chamber of an internal combustion engine in conventional manner and means are provided for applying a high voltage current across the gap between the two electrodes to create a spark. Spark initiation occurs at the point at which the two surfaces 90 and 93 are closest together, that is, at the end towards the junction of the side electrode with the spark plug body. The magnetic forces produced by the current in the spark and the side electrode causes the spark to travel along the rail-like surfaces 90, 93 towards the free end of the side electrode.

The translation of the arc along the rail-like surfaces will have the effect of supplying heat to and hence igniting a larger quantity of mixture than if the spark were static. This cools the thread of gas which is conducting the electrical current. This increases its electrical resistance and since external resistance, due to the leads and the coil, or its equivalent, is largely fixed, there will tend to be an increase in electrical energy at the arc.

Furthermore, the substantial clearance at either side of the rail-like surfaces 90, 93 enables the flame front to grow in area as it advances, thus rapidly reaching a larger volume of fresh combustible mixture. Cooling effects of the bodies of metal represented by the electrodes are also minimized.

The translation of the arc, extra arc energy, better exposure of combustible mixture and minimized cooling all contribute to a reduction of the duration of the first stage of ignition, the greater reduction occurring under the more difficult case of leaner mixture.

It might be supposed that the large area of the conventional electrodes has the effect of prolonging the life of the spark plug. However, erosion of the electrodes is governed by the amount of heat reaching any particular volume of metal. When, as here described, the arc is deliberately caused to traverse the rail-like surfaces, the amount of heat to any particular volume is minimized with ensuing prolongation of the electrode life.

The spark plug as described therefore provides a high efficiency spark initiation and flame generation pattern giving good combustion characteristics and also enabling lean mixtures to be effectively used, thus enhancing the fuel economy of the engine. Good combustion characteristics also ensure maximum burning of the mixture in the combustion chamber so that exhaust pollution is minimized.

The spark plug according to the invention can also have different types of electrodes. For example, the side electrode may extend laterally directly towards the side of the central electrode from the adjacent wall of the body, either at a level with the end of the body or above it.

Although preferred embodiments of the invention have been disclosed and described herein, it should be understood that the present invention is in no sense limited thereby and its scope is to be determined only by that of the appended claims.

I claim:

1. A carburetor metering system, comprising:

air flow control valve means, including an air inlet and an air outlet, for metering the flow of air from said air inlet to said air outlet in dependence upon the air pressure differential between the air inlet and air outlet to maintain the pressure differential at a predetermined value;

fuel valve means having an inlet connected to a source of fuel, and an outlet, said fuel valve means being operatively connected to said air flow control valve means so that the fuel valve means provides a respective increase and decrease in fuel flow rate in respective dependence upon an increase and decrease in air flow rate by said air flow control means;

a fuel pressure differential valve means for maintaining the pressure differential across the fuel valve means substantially constant, said fuel pressure differential means comprises a chamber having a diaphragm to define first and second subchambers; and restricter means connected across the fuel valve means at the inlet and outlet, wherein the pressure across the diaphragm is at a fixed predetermined fraction of the total pressure difference across the fuel valve means, to thereby provide a metering system wherein the fuel and air pressures are controlled separately.

2. A carburetor metering system according to claim 1, wherein the restricter means comprises two restrictors connected in series across the fuel valve means at the inlet and outlet, and wherein the fuel pressure differential valve means comprises a chamber having a diaphragm to define first and second subchambers, the first subchamber being in communication with the fuel valve means outlet and the second subchamber being in communication with the junction of the two restrictors.

3. A carburetor metering system according to claim 2, wherein the two restrictors are adjustable.

4. A carburetor metering system according to claim 1, wherein the fuel valve means comprises a fuel valve member movable along a displacement axis with respect to a valve seat to vary the fuel flow between two limiting positions, namely a substantially closed position and a fully open position, the fuel valve member and the valve seat having substantially closed position and a fully open position, the fuel valve member and the valve seat having substantially parallel surfaces which are inclined with respect to the displacement axis and which define therebetween a passage for the flow of fuel having a width corresponding to distance apart of the parallel surfaces and a length corresponding to the degree of overlap between the parallel surfaces, the form of said surfaces being such that, as the fuel valve member is moved along the displacement axis from its substantially closed position towards its fully open position, the length and width of the passage increase substantially proportionally from values of substantially zero.

5. A carburetor metering system according to claim 1, further including wick means for absorbing liquid fuel and for exposing said fuel to the air flow.

6. A carburetor metering system according to claim 5, wherein the wick means comprises a cloth of woven strands.

7. A carburetor metering system according to claim 6, wherein each of the strands comprises a plurality of twisted or braided fibers.

8. A carburetor metering system according to claim 7, wherein the fibers are made of metal wire.

9. A carburetor metering system according to claim 7, wherein the fibers are made of glass.

10. A carburetor metering system according to claim 7, wherein the fibers are made of natural material.

11. A carburetor metering system according to claim 7, wherein the plurality is six and the fibers are arranged with one central fiber and five fibers twisted around said central fiber.

12. A carburetor metering system according to claim 1, adapted for use in a fuel combustion system, said system including at least one spark plug.

13. A carburetor metering system according to claim 12, wherein said spark plug has a central electrode and a side electrode having respective sparking surfaces arranged opposite one another and defining a spark gap therebetween, each of the sparking surfaces being elongate and being flanked along its longitudinal edges by oppositely inclined surfaces sloping away from the sparking surface, wherein the two sparking surfaces are inclined relative to one another in the longitudinal direction so that the spark gap widens in the direction in which sparking tends to advance along the gap.

14. A carburetor metering system according to claim 13, wherein the sparking surface of the central electrode has a circular cross-section at a distance from its sparking surface and its sparking surface constitutes an end surface of the central electrode.

15. A carburetor metering system according to claim 14, wherein the sparking surface of the central electrode has its longitudinal edges symmetrically disposed with respect to a diameter of the central electrode.

16. A carburetor metering system according to claim 13, wherein the side electrode is elongate and extends inwardly from one side of the central electrode and its sparking surface extends generally lengthwise of the side electrode.

17. A carburetor metering system according to claim 16, wherein the sparking surface of the side electrode has its longitudinal edges symmetrically disposed with respect to the direction in which the side electrode extends.

18. A carburetor metering system according to claim 16, in which the side electrode is generally L-shaped.

19. A carburetor metering system according to claim 13, wherein the sparking surface of the central electrode, and the sparking surface of the side electrode constitutes an end surface of the side electrode which extends inwardly from one side of the central electrode.

20. A method for metering liquid fuel and air for carburetion, comprising:

metering the flow of air between an air inlet and an air outlet in an air control valve in dependence upon the air pressure differential across the air control valve to maintain the pressure differential at a predetermined value, metering a source of liquid fuel from a fuel inlet to a fuel outlet in dependence on the metering of the flow of air so that the liquid fuel metering respectively increases and decreases when the air flow rate increases and decreases, maintaining the pressure across a fuel pressure differential valve means at a substantially constant first pressure value and maintaining the pressure across a fuel valve means at a predetermined second pressure value, said first pressure value being a fixed fraction of said first pressure value, whereby the fuel and air pressures are controlled separately.

\* \* \* \* \*